United States Patent
Kim et al.

(10) Patent No.: US 9,225,864 B2
(45) Date of Patent: Dec. 29, 2015

(54) IMAGE FORMING APPARATUS, MOBILE APPARATUS AND PRINTING CONTROL METHOD

(71) Applicant: SAMSUNG ELECTRONICS CO., LTD., Suwon-si, Gyeonggi-do (KR)

(72) Inventors: Hong-seock Kim, Suwon-si (KR); Yong-im Kim, Seoul (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 14/727,006

(22) Filed: Jun. 1, 2015

(65) Prior Publication Data
US 2015/0350461 A1    Dec. 3, 2015

(30) Foreign Application Priority Data
Jun. 2, 2014    (KR) .................. 10-2014-0066846

(51) Int. Cl.
*G06F 15/00*    (2006.01)
*G06F 3/12*    (2006.01)
*G06K 1/00*    (2006.01)
*H04N 1/00*    (2006.01)
*H04N 1/32*    (2006.01)

(52) U.S. Cl.
CPC ............ *H04N 1/0096* (2013.01); *G06F 3/1203* (2013.01); *G06F 3/1292* (2013.01); *G06F 3/1296* (2013.01); *H04N 1/00307* (2013.01); *H04N 1/00954* (2013.01); *H04N 1/32545* (2013.01); *H04N 2201/0094* (2013.01)

(58) Field of Classification Search
CPC ... G06F 3/1203; G06F 3/1292; G06F 3/1296; H04N 1/0096; H04N 1/00307; H04N 1/00954; H04N 1/32545; H04N 2201/0094
USPC .................................. 358/1.1–1.18
See application file for complete search history.

(56) References Cited

U.S. PATENT DOCUMENTS 8,896,871 B2 *    11/2014    Pangrazio et al. ............ 358/1.15
2014/0362398 A1 *    12/2014    Ward et al. ................... 358/1.15

* cited by examiner

*Primary Examiner* — Douglas Tran
(74) *Attorney, Agent, or Firm* — Staas & Halsey LLP

(57) ABSTRACT

An image forming apparatus is provided. The image forming apparatus includes: function units with regard to image forming; a control unit configured to control the function units to simultaneously perform a first job and a second job when an execution command of the second job using one of first and second function units from among the function units is detected while the first job using one of the first and second function units is performed; and a communication interface unit configured to transmit data required for the second job to other apparatuses connected to the image forming apparatus to temporarily store the data in a repository of the other apparatuses.

22 Claims, 11 Drawing Sheets

USE MEMORY OF PRINTER REGISTERED IN VIRTUAL
GROUPING OF PRINTING APPARATUS

USE MEMORY OF CONNECTED MOBILE
WHEN USER TAPS MOBILE

IMAGE FORMING APPARATUS, MOBILE APPARATUS AND PRINTING CONTROL METHOD

CROSS-REFERENCE TO RELATED APPLICATIONS

This application claims priority from Korean Patent Application No. 10-2014-0066846, filed on Jun. 2, 2014, in the Korean Intellectual Property Office, the disclosure of which is incorporated herein by reference in its entirety.

BACKGROUND OF THE INVENTION

1. Field of the Invention

Apparatuses and methods consistent with embodiments of the present invention relate to an image forming apparatus, a mobile apparatus, and a printing control method, and more particularly, to an image forming apparatus, a mobile apparatus, and a printing control method capable of using another image forming apparatus connectable to the image forming apparatus or a storage space of the mobile apparatus to simultaneously (i.e., concurrently or in parallel) perform a plurality of jobs using different functions.

2. Description of the Related Art

Generally, an image forming apparatus means an apparatus which prints printing data generated from a terminal apparatus like a computer on a recording sheet. An example of the image forming apparatus may include a copier, a scanner, a printer, a facsimile, a multi function peripheral (MFP) that functions of them are compositely implemented into one apparatus, or the like.

As described above, the multi function peripheral (MFP) is an apparatus in which the functions of the copier, the scanner, the printer, the facsimile are integrated and may therefore perform a scanning job, a printing job, and a copying job with which the scanning job and the printing job are combined, etc.

However, even though a unit performing the scanning job and a unit performing the printing job are divided, the existing multi function peripheral may not perform the scanning job during the execution of the printing job and may not perform the printing job during the execution of the scanning job.

That is, even though the printing unit is in an idle state during the job using the scanning unit and thus is not operated, the job using the printing unit may not be performed and even though the scanning unit is in an idle state during the job using the printing unit and thus is not operated, the job using the scanning unit may not be performed, such that the functions of the multi function peripheral may not be fully used.

Therefore, when the multi function peripheral is performing the printing job, there is inconvenience that a user wanting to perform the scanning job needs to wait for the printing job, which is being performed by the multi function peripheral, to finish.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

An image forming apparatus is provided. The image forming apparatus includes function units with regard to or in relation to image forming; a control unit configured to control the function units to perform a first job and a second job when an execution command of the second job using one of first and second function units from among the function units is detected while the first job using one of the first and second function units is performed. The present invention provides an image forming apparatus, a mobile apparatus, and a printing control method capable of using another image forming apparatus connectable to the image forming apparatus or a storage space of the mobile apparatus to simultaneously (i.e., concurrently or in parallel) perform a plurality of jobs using different functions.

According to an aspect of the present invention, an image forming apparatus includes: a scanning unit configured to scan information, for example, a document, a manuscript, or an image, to generate a scanning image; a printing unit configured to print printing data; a control unit configured to control the scanning unit and the printing unit to simultaneously perform a first job and a second job when an execution command of the second job using one of the scanning unit and the printing unit is input while the first job using the other one of the scanning unit and the printing unit is performed; and a communication interface unit configured to transmit data required for the second job to other apparatuses connected to the image forming apparatus to temporarily store the data in a repository of the other apparatuses.

The first job may be a printing job using the printing unit, and the second job may be one of a scanning job using the scanning unit and a fax transmitting job.

The communication interface unit may transmit a scanning image generated from the scanning unit to the repository so as to temporarily store the generated scanning image in the repository and receives the scanning image transmitted to the repository at any timing.

The control unit may determine whether to perform the second job in consideration of available capacity of an internal storage space within the image forming apparatus and if it is determined that the execution of the second job is not made using the internal storage space, transmit data required for the second job to the repository through the communication interface unit.

The control unit may receive job data stored in the repositories of the other apparatuses through the communication interface unit when a space to process the data required for the second job is secured within the internal storage space, depending on the progress of the first job.

The control unit may determine at least one of other image forming apparatuses within a preset job group in which the image forming apparatuses is included as repositories of the other apparatuses in which the data required for the second job are stored.

The control unit may determine at least one of the other image forming apparatuses within the job group as the repositories of the other apparatuses in which the data required for the second job are stored, in consideration of available capacity of storage spaces of each of the other image forming apparatuses within the job group.

The control unit may determine a plurality of other image forming apparatuses within the job group as the repositories in which the data required for the second job are stored when the available capacity of each of the other image forming apparatuses within the job group is not sufficient to store the data required for the second job.

The communication interface unit may receive an execution command of the second job from a mobile apparatus and the control unit may determine the mobile apparatus as a repository in which the data required for the second job are stored.

The image forming apparatus may further include: a storage unit configured to store job data, wherein the control unit stores the data in the storage unit when the data are received from other image forming apparatuses within a job group, and transmits the data stored in the storage unit to the other image forming apparatuses through the communication interface unit, in response to a request of the other image forming apparatuses.

According to another aspect of the present invention, a mobile apparatus connectable to an image forming apparatus includes: a communication interface unit configured to transmit an execution command of a second job using one of a scanning unit and a printing unit to the image forming apparatus performing a first job using the other one of the scanning unit and the printing unit; a storage unit configured to store received data when the data required for the second job are received; and a control unit configured to transmit the stored data to the image forming apparatus through the communication interface unit when receiving a request for transmission of the stored data from the image forming apparatus.

According to another aspect of the present invention, a printing control method of an image forming apparatus includes: performing a first job using one of a scanning unit and a printing unit; receiving an execution command of a second job using the other one of the scanning unit and the printing unit while the first job is performed; and performing the second job simultaneously with performing the first job, in response to the execution command of the second job, wherein in the performing of the second job, data required for the second job are transmitted to other apparatuses connected to the image forming apparatus to be temporarily stored in a repository of the other apparatuses.

The first job may be a printing job using the printing unit and the second job may be one of a scanning job using the scanning unit and a fax transmitting job.

In the performing of the second job, a scanning image generated from the scanning unit may be transmitted to the repository so as to temporarily store the generated scanning image in the repository and the scanning image transmitted to the repository may be received at any timing.

The printing control method may further include: determining whether to perform the second job in consideration of available capacity of an internal storage space within the image forming apparatus, wherein in the performing of the second job, when the execution of the second job is not made using the internal storage space, the data required for the second job are transmitted to the repository.

In the performing of the second job, job data stored in the repository of the other apparatuses may be received when a space to process the data required for the second job is secured within the internal storage space, depending on the progress of the first job.

The printing control method may further include: determining at least one of other image forming apparatuses within a preset job group in which the image forming apparatus is included as repositories of the other apparatuses in which the data required for the second job are stored.

In the determining, at least one of the other image forming apparatuses within the job group may be determined as the repositories of the other apparatuses in which the data required for the second job are stored, in consideration of available capacity of storage spaces of each of the other image forming apparatuses within the job group.

In the determining, a plurality of other image forming apparatuses within the job group may be determined as the repository in which the data required for the second job are stored when the available capacity of each of the other image forming apparatuses within the job group is not sufficient to store the data required for the second job.

The printing control method may further include: determining a mobile apparatus as the repository in which the data required for the second job are stored, wherein in the receiving, an execution command of the second job is received from the mobile apparatus.

The printing control method may further include: storing the data in a storage unit within the image forming apparatus when the data are received from other image forming apparatuses within a job group, and transmitting the data stored in the storage unit to the other image forming apparatuses, in response to a request of the other image forming apparatus.

According to another aspect of the present invention, there is provided a computer readable recording medium including a program for executing a printing control method of a mobile apparatus connectable to an image forming apparatus, wherein the printing control method includes: transmitting an execution command of a second job using one of a scanning unit and a printing unit to the image forming apparatus performing a first job using the other one of the scanning unit and the printing unit; storing received data when the data required for the second job are received; and transmitting the stored data to the image forming apparatus when the transmission of the stored data is requested from the image forming apparatus.

Additional and/or other aspects and advantages of the invention will be set forth in part in the description which follows and, in part, will be obvious from the description, or may be learned by practice of the invention.

BRIEF DESCRIPTION OF THE DRAWING FIGURES

The above and/or other aspects of the present invention will be more apparent by describing certain exemplary embodiments of the present invention with reference to the accompanying drawings, in which.

DETAILED DESCRIPTION OF THE EXEMPLARY EMBODIMENTS

Hereinafter, one exemplary embodiment of the present invention will be described in detail with reference to the accompanying drawings. However, in describing the present invention, if it is determined that the detail description of relevant known functions or components makes subject matters of the present invention obscure, the detailed description thereof will be omitted.

Figure 1:
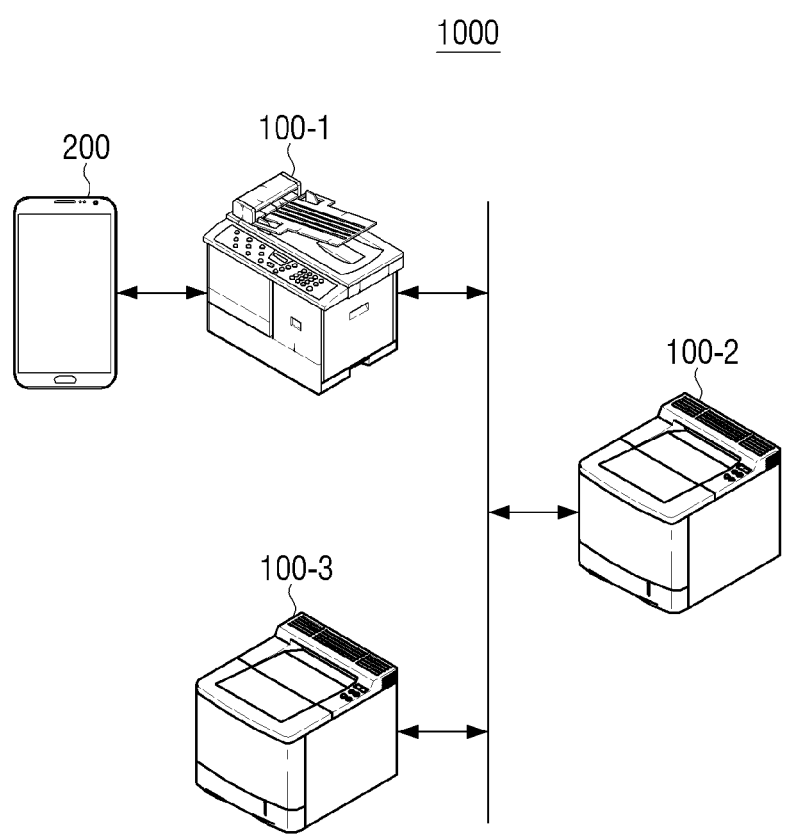
FIG. 1 is a block diagram illustrating an image forming system according to an exemplary embodiment of the present invention.

FIG. 1 is a block diagram illustrating an image forming system according to an exemplary embodiment of the present invention.

Referring to FIG. 1, an image forming system 1000 according to an exemplary embodiment of the present invention includes a plurality of image forming apparatuses 100-1, 100-2, and 100-3 and a mobile apparatus 200.

The image forming apparatuses 100-1, 100-2, and 100-3 receive a job execution command and perform the received job execution command. Here, the image forming apparatuses 100-1, 100-2, and 100-3 may be a printer, a scanner, a copier, a facsimile, and a multi function peripheral which may perform at least one of a scanning job, a printing job, a copying function, a fax function, and an image editing function. Here, the job execution command may be directly received from each of the image forming apparatuses 100-1, 100-2, and 100-3 and may be received through the mobile apparatus 200.

Meanwhile, the image forming apparatus 100-1 determines whether to execute the received job execution command using its own resource and if it is determined that the received job execution command may not be executed using its own resource, the image forming apparatus 100-1 may execute the received job execution command using resources of other image forming apparatuses 100-2 and 100-3. Hereinafter, using the resources of the plurality of image forming apparatuses to perform one job execution command is called a virtual grouping of resources operation, which is a virtual or logical grouping, or sharing, of resources of target image forming apparatuses for distributed processing (i.e., to progress or continue execution, or to reach or achieve completion of a job). The virtual grouping operation may be divided into a memory virtualization operation using memory resources of other apparatuses and a function virtualization operation using functions of other apparatuses. The memory virtualization operation will be described below with reference to FIGS. 2 and 3. Further, the function virtualization operation will be described below with reference to FIGS. 4 and 5. The virtual grouping operation may be performed in two image forming apparatuses and may also be performed in at least three image forming apparatuses. Meanwhile, a detailed configuration and operation of the image forming apparatus 100 will be described below with reference to FIGS. 6 and 7.

The mobile apparatus 200 may display lists of communicationally connectable (i.e., coupled) image forming apparatuses 100-1, 100-2, and 100-3 and selected by a user an image forming apparatus which performs the job execution.

Further, the mobile apparatus 200 displays user interface (UI) for controlling the function of the selected image forming apparatus 100-1 and receives the job execution command for the selected image forming apparatus 100-1 through the displayed UI. In this case, the received job execution command may be a control for one image forming apparatus 100-1 and the job execution command for the plurality of image forming apparatuses 100-1, 100-2, and 100-3. Further, the received job execution command may be a multi job execution command to allow the image forming apparatuses 100-1, 100-2, and 100-3 to simultaneously perform the plurality of jobs. Here, the multi job execution command may also be a command to allow the image forming apparatus 100-1 to simultaneously perform a first job using one of the scanning unit and the printing unit and a second job using the other one of the scanning unit and the printing unit.

Further, the mobile apparatus 200 transmits the received job execution command to the image forming apparatus 100-1 which is selected by a user. Further, the mobile apparatus 200 may receive and store data required to perform the job corresponding to the job execution command transmitted from the image forming apparatus 100-1. Further, the data which are stored in the mobile apparatus 200 may be transmitted to the corresponding image forming apparatus 100-1 in response to a request of the image forming apparatus 100-1. A detailed configuration and operation of the mobile apparatus 200 will be described below with reference to FIG. 8. Here, the mobile apparatus 200 may be a notebook, a mobile phone, a smart phone, a PMP, an MP3 player, etc.

As described above, the image forming system 1000 according to the exemplary embodiment of the present invention may be configured to allow the image forming apparatus 100-1 to use the functions of other image forming apparatuses 100-2 and 100-3, and therefore may extendedly provide the functions which are not supported by the corresponding image forming apparatus 100-1, thereby performing the job at a higher speed.

Further, the image forming system 1000 according to the exemplary embodiment of the present invention may be configured to allow the image forming apparatus 100-1 to perform other jobs while performing one job, thereby performing the job at an even higher speed. Further, when the storage space is insufficient while the image forming apparatus 100-1 performs the job, the image forming apparatus 100-1 may perform the job using the memory resources of other image forming apparatuses 100-2 and 100-3 or the mobile apparatus 200, thereby stably performing the plurality of jobs.

Meanwhile, FIG. 1 illustrates that one mobile apparatus 200 is connected to three image forming apparatuses, but actually, one mobile apparatus 200 may be connected to two image forming apparatuses and may also be connected to at least four image forming apparatuses. Further, each of the image forming apparatuses 100-1, 100-2, and 100-3 may be connected to a plurality of mobile apparatuses.

Further, actually, each of the apparatuses may be implemented to be directly connected to one another and may also be implemented to be indirectly connected to one another via a router and other apparatuses (for example, server), etc. Further, the illustrated example describes that each of the apparatuses may be implemented to be connected to one another by a wired line, but actually, each of the apparatuses may also be implemented to be wirelessly connected to one another.

Further, FIG. 1 illustrates that the user inputs the job execution command through the mobile apparatus, but actually, each of the image forming apparatuses 100-1, 100-2, and 100-3 may also receive the job execution command.

Further, FIG. 1 illustrates that the multi job execution command is a command to allow the image forming apparatus to perform other jobs while performing any one of the jobs, but the multi job execution command may also be a command to allow the image forming apparatus, which does not perform the job, to simultaneously perform the plurality of jobs.

Figure 2:
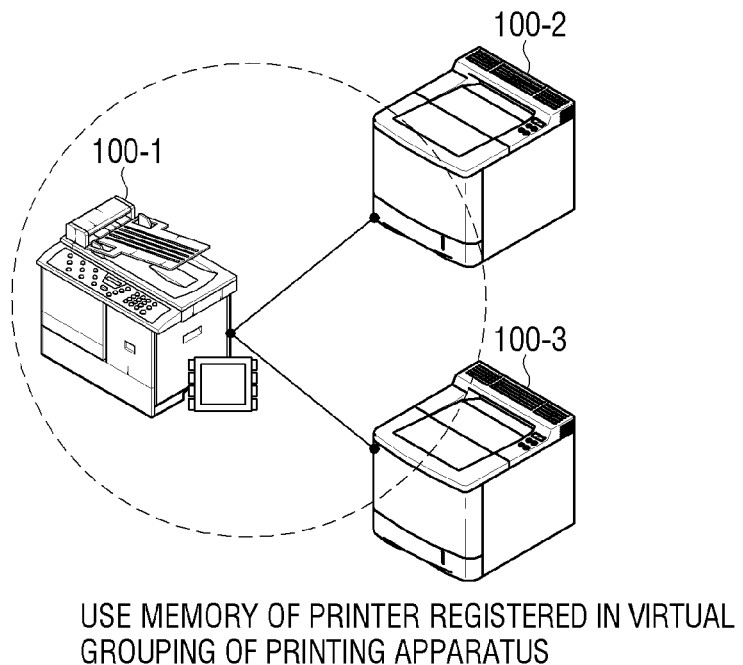
FIGS. 2 and 3 are diagrams for describing a memory virtualization operation according to an exemplary embodiment of the present invention.
Figure 3:
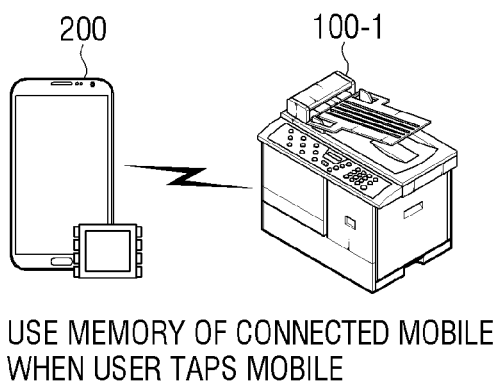

FIGS. 2 and 3 are diagrams for describing the memory virtualization operation according to an exemplary embodiment of the present invention.

The virtualization memory operation according to the exemplary embodiment of the present invention performs a job using the memory resource of the other image forming apparatus 100-2 while the image forming apparatus 100-1 performs a job.

The memory virtualization operation may be implemented by the following two schemes.

A first scheme is a scheme using the memory resources of other image forming apparatuses within a virtualization group and a second scheme is a scheme using the memory resource of the corresponding mobile apparatus 200 when the job execution command is received from the mobile apparatus 200. First, the first scheme will be described with reference to FIG. 2 and the second scheme will be described with reference to FIG. 3.

Referring to FIG. 2, the image forming system includes three image forming apparatuses 100-1, 100-2, and 100-3.

Hereinafter, for ease of explanation, the functions of each image forming apparatus of FIG. 2 are assumed as follows. First, the first image forming apparatus 100-1 is a current image forming apparatus, at which a user is positioned, to input the job execution command and includes a scanning unit, an image forming unit, and a fax unit to support scanning, printing, copying, fax transmission, and fax reception. Further, the second image forming apparatus 100-2 is another image forming apparatus which is not directly manipulated by the user and includes the image forming unit to support mono printing. That is, the second image forming apparatus 100-2 is a mono printer. Further, the third image forming apparatus 100-3 is another image forming apparatus which is not directly manipulated by the user and includes a color image forming unit to support mono printing and color printing. That is, the third image forming apparatus 100-3 is the color printer.

Typically, since the scanning function and the printing function are configured of a separate unit, if a memory resource enough to store data required for the execution (i.e., to progress or continue execution, to reach or achieve completion, necessary for execution) of each function is supported, two functions may be individually operated.

In detail, the image forming apparatus having the scanning function and the printing function typically supports the copying function with the two combined functions, in which the image forming apparatus may simultaneously perform the scanning function and the printing function in that the copying function is a job of simultaneously performing the scanning function and the printing function. However, there is no problem to perform the processing using of the memory resource of the image forming apparatus itself in that the copying function allows data used in the scanning function to be used in the printing function as they are.

However, when the data used in the printing function and the data used in the scanning function are different, it is not sufficient to store both of the data of the two functions using the memory resource of the image forming apparatus itself. In this aspect, the existing image forming apparatus does not support individually and simultaneously executing the scanning function and the printing function other than the copying function using the same data (i.e., cannot progress or continue execution, or reach or achieve completion of a job).

Therefore, according to the exemplary embodiment of the present invention, the job may be performed using the memory resource of the current image forming apparatus 100-1 and the memory resource of another image forming apparatus 100-2. Here, the memory resource includes a storage space of a volatile memory and a storage space of a nonvolatile hard disk driver or a flash memory.

In detail, when the first image forming apparatus 100-1 receives the execution command of the scanning job using the scanning unit during the printing job using the printing unit, the first image forming apparatus 100-1 may use its own memory resource to perform the printing job and may use the memory resource of the first image forming apparatus 100-1 and the memory resource of another second image forming apparatus 100-2 to perform the scanning job. In more detail, when the first image forming apparatus 100-1 itself may not store the data used in the scanning job, the first image forming apparatus 100-1 may transmit the data so that the corresponding data is stored, for example, temporarily, in another second image forming apparatus 100-2. Further, the first image forming apparatus 100-1 may receive and use the transmitted data at the timing when the data stored in the second image forming apparatus 100-2 are required. Meanwhile, the case in which the data used in the scanning job are temporarily stored in another second image forming apparatus 100-2 is described above, but actually, the data used in the printing job may also be temporarily stored in another second image forming apparatus 100-2. Further, the data used in the scanning job and the data used in the printing job each may also be temporarily stored in the second image forming apparatus 100-2. In this case, the first image forming apparatus 100-1 may use various data requesting methods like a network file transmission method, a database query, an NoSQL, pull/push data processing, etc., to transmit data required for a second job to another second image forming apparatus 100-2. Here, the NoSQL is a database which provides a mechanism for data storage and retrieval using a less restrictive consistency model than a traditional relational database.

Here, the transmitted data may be all the data required to perform the corresponding job and may be a portion of the data required to perform the corresponding job. For example, when a scanning command input during the printing job is a job of scanning information, for example, five sheets of manuscripts, and a memory resource which may be allocated to the scanning job may store 1 or 2 sheets of scanning images, the scanning image generated depending on the scanning of the first manuscript may be temporarily stored in its own resource and then be transmitted to another second image forming apparatus 100-2 and the scanning images for manuscripts of other pages may be sequentially transmitted to another second image forming apparatus 100-2.

Further, when the memory resource which may be allocated to the scanning job is enough to perform all the jobs, the first image forming apparatus 100-1 may receive first to fifth scanning images transmitted to another second image forming apparatus 100-2 to generate the final scanning data.

Meanwhile, the case in which the first image forming apparatus 100-1 may use the memory resource of another second image forming apparatus 100-2 is briefly described, but actually, the first image forming apparatus 100-1 may use dynamic allocation of the memory resource to allocate the memory resource of the first image forming apparatus 100-1 and the memory resource of another second image forming apparatus 100-2 to each data required for the plurality of jobs. In this case, the dynamic allocation may be performed in consideration of priority (input order of the job) of each job, a memory size required for the job, time required to transmit the memory, etc.

Therefore, the method according the exemplary embodiment of the present invention may more reduce a total of job time than the existing method which sequentially performs the printing job and the scanning job.

Meanwhile, the case in which only the second image forming apparatus 100-2 participates in the virtual grouping operation is described above, but actually, instead of the second image forming apparatus 100-2, a third image forming apparatus 100-3 may participate in the virtual grouping operation and both of the second image forming apparatus 100-2 and the third image forming apparatus 100-3 may participate in the virtual grouping operation. Meanwhile, a detailed exemplary embodiment using the memory resources of a plurality of other apparatuses will be described with reference to FIG. 8.

The first method may be applied to the execution of the additional scanning job during the execution of the printing job and may be applied to the execution of the additional printing job during the execution of the scanning job. Further, the above-mentioned printing job may be applied to only the printing job and may also be applied to the fax receiving job of receiving the fax and printing the received fax. Further, the above-mentioned scanning job may perform only the scanning job and may also be applied to an e-book generating job which is combined with the scanning job to generate an e-book and a fax transmitting job which fax-transmits the scanned scanning image. In this aspect, the first job may be the printing job, the fax receiving job, the scanning job, the e-book generating job, and the fax transmitting job. Further, when the preceding job is the printing job and the fax receiving job, the second job may be one of the scanning job, the e-book generating job, and the fax transmitting job. Alternatively, when the preceding job is one of the scanning job, the e-book generating job, and the fax transmitting job, the second job may be one of the printing job and the fax receiving job.

The exemplary embodiment which uses another image forming apparatus 100-1 within the job group is described above, but actually, the memory virtualization operation using other apparatuses other than the image forming apparatus may also be made. Hereinafter, a second memory virtualization function will be described with reference to FIG. 3.

Referring to FIG. 3, the image forming system 1000 includes one image forming apparatus 100-1 and the mobile apparatus 200.

Referring to FIG. 3, the mobile apparatus 200 may request the execution of the second job which performs other functions while the first image forming apparatus 100-1 performs the first job using any one of the printing function and the scanning function. In this case, the first image forming apparatus 100-1 may use its own memory resource and the memory resource of the mobile apparatus 200 to perform the first job and the second job.

In detail, when the first image forming apparatus 100-1 receives the execution command of the scanning job using the scanning unit during the printing job using the printing unit through the mobile apparatus 200, the first image forming apparatus 100-1 may use its own memory resource to perform the printing job and may use the memory resource of the first image forming apparatus 100-1 and the memory resource of the mobile apparatus 200 to perform the scanning job.

In more detail, when the first image forming apparatus 100-1 itself may not store the data used in the scanning job, the first image forming apparatus 100-1 may transmit the data to the mobile apparatus 200 so that the corresponding data is temporarily stored in the mobile apparatus 200. Further, the first image forming apparatus 100-1 may receive and use the transmitted data at the timing when the data stored in the mobile apparatus 200 are required. Meanwhile, the memory virtualization operation according to the second exemplary embodiment of the present invention is different from that of the first exemplary embodiment of the present invention in that it uses the memory resource of the mobile apparatus 200, but the detailed memory sharing method is the same as the first exemplary embodiment of the present invention and therefore the description of the detailed memory sharing method will be omitted.

Meanwhile, the case in which the first image forming apparatus 100-1 uses the memory resource of the mobile apparatus 200 is described above, but actually, in combination with the above-mentioned first exemplary embodiment, the first image forming apparatus 100-1 may also use both of the memory resource of the mobile apparatus 200 and the memory resource of the second image forming apparatus 100-2.

Similarly, the second method may be applied to the execution of the additional scanning job during the execution of the printing job and may also be applied to the execution of the additional printing job during the execution of the scanning job. Further, the above-mentioned printing job may perform only the printing job and may also be applied to the fax receiving job of receiving the fax and printing the received fax. Further, the above-mentioned scanning job may perform only the scanning job and may also be applied to an e-book generating job which is combined with the scanning job to generate an e-book and a fax transmitting job which fax-transmits the scanned scanning image.

Meanwhile, in describing FIGS. 2 and 3, in the case of performing the second job using a different function from the first job during the execution of the first job, only the memory virtualization operation using the memories of other apparatuses is described, but actually, the memory virtualization operation may also be applied to the case of performing one job. For example, the first job requested by the user is the e-book generating job of scanning tens of sheets of documents, for example, manuscripts, to generate a PDF file or if the image forming apparatus has an insufficient memory resource storing the scanning images corresponding to tens of sheets of manuscripts, the foregoing memory virtualization operation may be applied to use the memory resources of other image forming apparatuses or the mobile apparatus.

Figure 4:
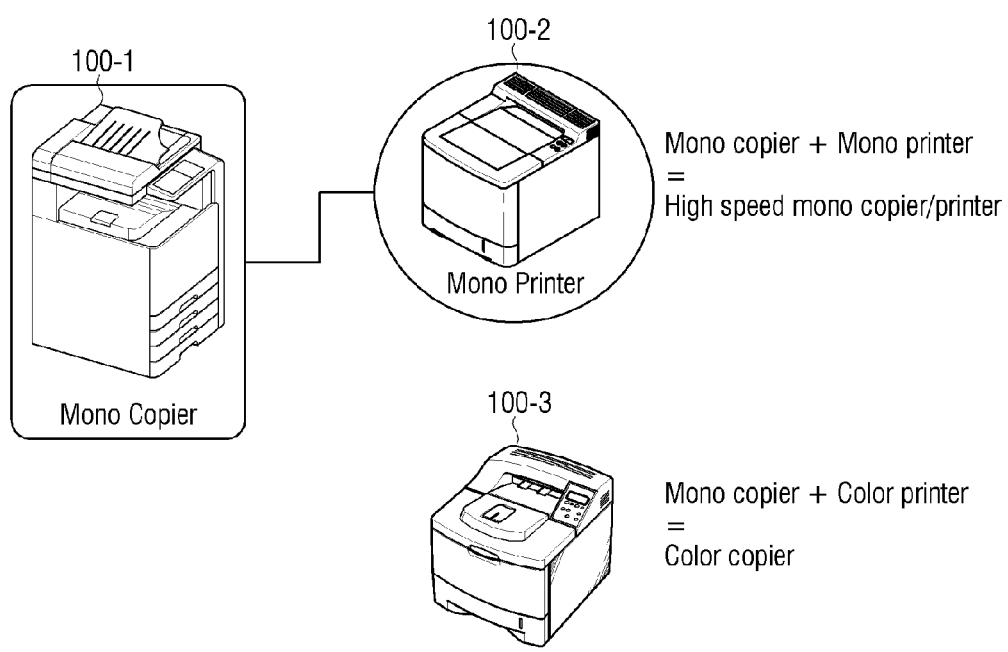
FIGS. 4 and 5 are diagrams for describing a function virtualization operation according to an exemplary embodiment of the present invention.
Figure 5:
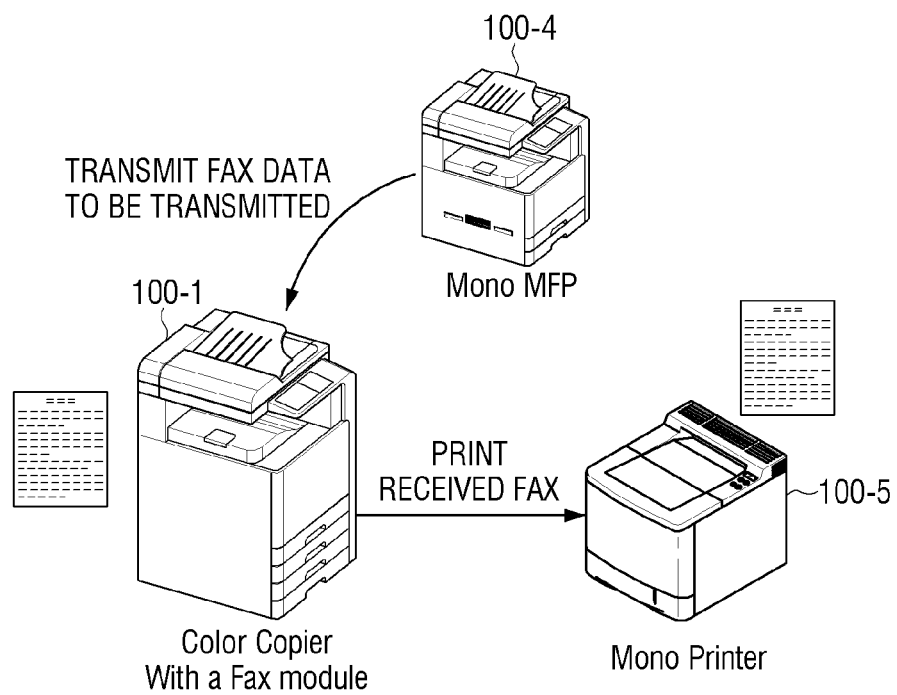

FIGS. 4 and 5 are diagrams for describing a function virtualization operation according to an exemplary embodiment of the present invention.

The function virtualization operation according to the exemplary embodiment of the present invention means that the plurality of image forming apparatuses 100-1, 100-2, and 100-3 perform one job using a plurality of functions. Here, the function may include a scanning function, a printing function, a fax transmitting function, a fax receiving function, an e-mail transmitting function, a server transmitting function, a format converting function, an editing function, and the like. Meanwhile, the copying function is a combined function of the scanning function with the printing function and a scan to e-mail, a scan to server, etc., are a combination of a plurality of functions.

The function virtualization operation may be implemented by the following two schemes.

The first scheme is a scheme of using apparatus B to more quickly processing the functions which may be performed by apparatus A. Further, a second scheme is a scheme of using the apparatus B to extend functions which may not be performed by the apparatus A. First, the first scheme will be described with reference to FIG. 4 and the second scheme will be described with reference to FIGS. 4 and 5.

First, referring to FIG. 4, the image forming system includes three image forming apparatuses 100-1, 100-2, and 100-3.

Hereinafter, for ease of explanation, the functions of each image forming apparatus of FIG. 4 are assumed as follows. First, the first image forming apparatus 100-1 is the current image forming apparatus, at which the user is positioned, to input the job execution command and includes the scanning unit, the image forming unit, and the fax unit to support the scanning, the printing, the copying, the fax transmission, and the fax reception. Further, the second image forming apparatus 100-2 is another image forming apparatus which is not directly manipulated by the user and includes the image forming unit to support the mono printing. That is, the second image forming apparatus 100-2 is the mono printer. Further, the third image forming apparatus 100-3 is another image forming apparatus which is not directly manipulated by the user and includes the color image forming unit to support the mono printing and the color printing. That is, the third image forming apparatus 100-3 is the color printer.

Typically, a scanning speed of the scanning unit is quicker than the printing speed of the image forming unit. Therefore, in the case of performing the copying job (combination of the scanning job with the printing job), the scanning job is quickly completed but the printing job requires much time and thus the user has to wait for a long time.

Therefore, to reduce the waiting time, the present exemplary embodiment may perform the job using the current first image forming apparatus 100-1 and another second image forming apparatus 100-2. In detail, the first image forming apparatus 100-1 may scan manuscripts to generate the scanning image and may print a portion of the generated scanning images. Further, the first image forming apparatus 100-1 may transmit the rest (i.e., remaining or a portion) of the scanning images to another second image forming apparatus 100-2. In this case, another second image forming apparatus 100-2 may perform the printing job on the received scanning image. Therefore, the present exemplary embodiment may more reduce a total of job time to perform the copying job than the existing scheme.

Meanwhile, the case in which only the second image forming apparatus 100-2 participates in the virtual grouping operation is described above, but actually, instead of the second image forming apparatus 100-2, the third image forming apparatus 100-3 may participate in the virtual grouping operation and both of the second image forming apparatus 100-2 and the third image forming apparatus 100-3 may participate in the virtual grouping operation.

The first scheme may also be applied to the copying job, fax transmitting job, and the e-book generating job, etc. For example, the fax transmission is generally a job which requires much time. Therefore, by the function virtualization scheme, the plurality of scanning images are generated by the apparatus A, the fax transmitting job for a portion of the scanning images is performed by the apparatus A, and the rest scanning images are transmitted to the apparatus B to allow the apparatus B to perform the fax transmitting job for the rest scanning images.

Further, at the time of generating the e-book requiring a large amount of scanning job, the apparatus A may scan a portion of the manuscripts to generate scanning image C and the apparatus B may scan the rest manuscripts to generate scanning image D. Further, the apparatus B may receive the scanning image C generated by the apparatus A and image-process scanning image D which is generated by the apparatus B and the received scanning image C to generate an e-book.

Three exemplary embodiments related to the first function virtualization scheme are described above, but actually, the present invention may be applied to other examples if a job uses the functions of the plurality of image forming apparatuses as well as the above-mentioned exemplary embodiments.

Hereinafter, the second virtualization scheme will be described.

Since the printing unit included in the first image forming apparatus 100-1 is a mono printing unit which may not perform the color printing, even though the scanning unit of the first image forming apparatus 100-1 is configured to perform the color scanning, the first image forming apparatus 100-1 may not perform the color copying.

However, if the third image forming apparatus 100-3 which may perform the color printing is present at the circumference thereof, even though the first image forming apparatus 100-1 may not perform the color copying, according to the present exemplary embodiment, the first image forming apparatus 100-1 may perform the function virtualization operation like supporting the color copying.

The first image forming apparatus 100-1 which may perform the color copying using the virtual grouping operation may receive a color copying command from the user. In this case, the first image forming apparatus 100-1 color-scans the manuscripts to generate the color scanning image. Further, the first image forming apparatus 100-1 transmits the generated color scanning image to the third image forming apparatus 100-3, and thus the transmitted scanning image may be color-printed. In this case, the first image forming apparatus 100-1 may display the fact that color results are output from the third image forming apparatus 100-3. Therefore, the color copying may not be made under the existing printing environment, but the user may easily perform the color copying using the virtual grouping operation.

The function virtualization scheme may be applied even to the case in which the image forming apparatus 100-1 is the scanner. For example, when the image forming apparatus 100-1 is the scanner which may support only the scanning function, the image forming apparatus 100-1 may scan manuscripts to generate the scanning images and transmit the generated color scanning images to other image forming apparatuses 100-2 and 100-3 which may perform the printing job. Therefore, the first image forming apparatus 100 does not support the copying function but uses the functions of other image forming apparatuses to perform the copying job.

The second scheme may also be applied to the copying job, the fax transmitting job, and the e-book generating job, etc.

For example, the fax transmission may be performed only by the apparatus in which the fax unit is included and as illustrated in FIG. 5, a fourth image forming apparatus 100-4 does not include the fax unit and thus the fax transmission may not be made. However, when the virtual grouping operation according to the present exemplary embodiment is applied, the fourth image forming apparatus 100-4 may receive the fax transmitting command. Therefore, the fourth image forming apparatus 100-4 may scan manuscripts in response to the fax transmitting command from the user to generate the scanning images and transmit the generated scanning image to the first image forming apparatus 100-1 which may perform the fax transmission. In this case, the first image forming apparatus 100-1 may fax-transmit the received scanning image to a fifth image forming apparatus 100-5.

If the user is closer to the fourth image forming apparatus 100-4 than the first image forming apparatus 100-1, for example, the two image forming apparatuses 100-1 and 100-4 are positioned on different floors, the user may use the fourth image forming apparatus 100-4 which is positioned on the same floor without going to other floors for fax transmission to perform the fax job, thereby improving the user convenience and the utility of the existing office equipment which has a low frequency of use.

Further, only the up-to-date image forming apparatus may perform the e-book generating function and therefore the fourth image forming apparatus 100-4 which is the old-modeled multi function peripheral is not equipped with the e-book generating function. However, when the virtual grouping operation according to the present exemplary embodiment is applied and the first image forming apparatus 100-1 supports the e-book generating function, the fourth image forming apparatus 100-4 is equipment which may support the e-book generating function. Therefore, when receiving a command to generate manuscripts as an e-book from the user, the fourth image forming apparatus 100-4 may scan manuscripts to generate the scanning images and transmit the generated scanning images to the first image forming apparatus 100-1. The first image forming apparatus 100-1 which receives the scanning image may generate the received scanning image as the e-book. Further, the first image forming apparatus 100-1 may transmit the generated e-book to a repository (for example, management server) designated by the user.

As described above, three embodiments related to the second function virtualization scheme are described above, but actually, the present invention may be applied to other examples if a job uses the functions of the plurality of image forming apparatuses as well as the above-mentioned exemplary embodiments.

As described above, the function virtualization scheme according to the present exemplary embodiment may extend the function which is not supported by the existing image forming apparatus and therefore the user convenience is extended. Further, a speed of functions which are supported by the related art may also be increased.

Meanwhile, if the above-mentioned virtual grouping is applied to all the connectable image forming apparatuses, it is difficult to perform the management and the selection the apparatus. For example, the above-mentioned first virtual grouping scheme is performed. In this case, if time to go and get outputs to other image forming apparatuses takes longer than time to output all the outputs from one apparatus, the user may feel inconvenience.

Therefore, in applying the virtual grouping scheme, the plurality of image forming apparatuses may be used while being grouped in consideration of the positions of each apparatus, the functions which are supported by each apparatus, the user, etc. The grouping may be performed by the user or automatic algorithm and may be performed by the external server or the designation by the mobile apparatus.

As described above, if the plurality of image forming apparatuses are grouped into one job group, the function virtualization operation as described above and the above-mentioned memory virtualization operation may be performed together. That is, the plurality of image forming apparatuses within the job group may share the memory resources.

Figure 6:
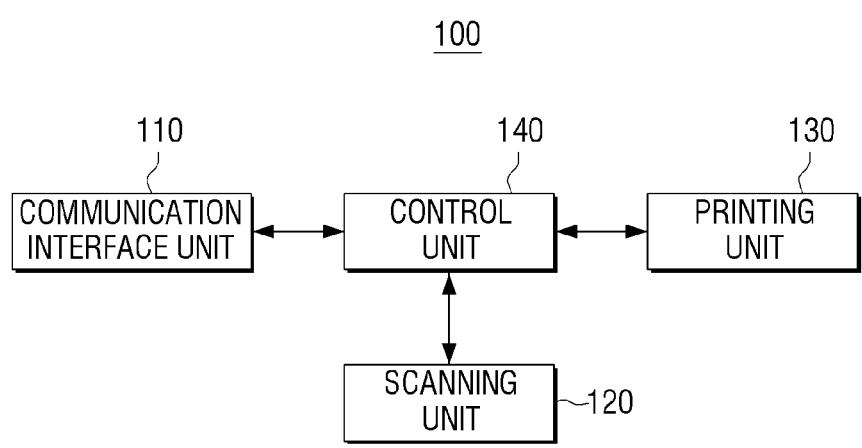
FIG. 6 is a schematic block diagram of an image forming apparatus according to an exemplary embodiment of the present invention.

FIG. 6 is a schematic block diagram of the image forming apparatus according to the exemplary embodiment of the present invention.

Referring to FIG. 6, the image forming apparatus 100 is configured to include the communication interface unit 110, the scanning unit 120, the printing unit 130, and the control unit 140. The image forming apparatus 100 may be a multi function peripheral which may perform the scanning job and the printing job as well as the plurality of functions such as the copying job, the fax transmission and the fax reception.

The image forming apparatus 100 may be the first image forming apparatus 100-1 using the memory resources of other apparatuses illustrated in FIGS. 2 and 3 and may be the second image forming apparatus 100-2 or the third image forming apparatus 100-3 which provides the memory resources to other apparatuses. Further, the image forming apparatus 100 may be the first image forming apparatus 100-1 using the functions of other image forming apparatuses illustrated in FIG. 4 and may be the second image forming apparatus 100-2 or the third image forming apparatus 100-3 which performs some functions of the function virtualization operation in response to the request of other image forming apparatus.

Meanwhile, for ease of description, the apparatus which is a subject of a job is described as the image forming apparatus 100-1 and is described as the image forming apparatuses 100-2 and 100-3 different from the corresponding image forming apparatus 100-1.

The communication interface unit 110 is formed to connect the image forming apparatus 100-1 to external devices and may also be implemented to be connected through a local area network (LAN) and the Internet network and to be connected through a universal serial bus (USB) port and a wireless module. Here, the wireless module may be WiFi, WiFi Direct, near field Communication (NFC), Bluetooth, etc.

The communication interface unit 110 retrieves other connectable image forming apparatuses 100-2 and 100-3. In detail, the communication interface unit 110 may retrieve the image forming apparatuses 100-2 and 100-3 which may be connected to the image forming apparatus 100-1 based on the communication scheme which is supported by the image forming apparatus 100-1.

For example, when using the WiFi, the communication interface unit 110 may retrieve the image forming apparatuses which may be connected through the WiFi and when supporting the WiFi and the WiFi Direct, the communication interface unit 110 may retrieve the image forming apparatuses which may be connected by each connection scheme.

Further, the communication interface unit 110 receives the apparatus information on the other retrieved image forming apparatuses 100-2 and 100-3. In detail, the communication interface unit 110 may receive the information on other surrounding connectable image forming apparatuses or information on other image forming apparatuses which are selected by the user.

Here, the apparatus information may include an apparatus name, address information (information required for connection with the image forming apparatus such as IP address, MAC information, etc.), function information (information on functions which are supported by the image forming apparatus such as whether to perform the color printing, whether to perform the scanning, etc.), and state information (available capacity of internal storage space, whether to perform the current job, whether an error occurs, a job progress state, etc.).

Further, the communication interface unit 110 may receive the information on the job group to which the image forming apparatus 100-1 belongs from the external server or the mobile apparatus 200. The information on the job group may be information on the image forming apparatus which is once tagged by the mobile apparatus 200, the information on the plurality of image forming apparatuses which are set by a manager, or the information on the other image forming apparatuses 100-2 and 100-3 which are classified by a preset algorithm and are within the job group to which the corresponding image forming apparatus 100-1 belongs.

Further, the communication interface unit 110 transmits the UI for controlling the function of the image forming apparatus 100 to the mobile apparatus 200. In detail, the mobile apparatus 200 according to the exemplary embodiment of the present invention may display the UI by two schemes. The first scheme allows the mobile apparatus 200 to receive the apparatus information on the image forming apparatus so as to configure the UI and display the UI and the second scheme allows the image forming apparatus to generate the UI and receive and display the generated UI.

Further, the communication interface unit 110 receives the job execution command through the mobile apparatus 200. In this case, the communication interface unit 110 may receive the job to be executed and information on a function option of the corresponding job together. The job execution command may be a general job execution command and may be a multi job command which has to simultaneously perform a plurality of jobs. Here, the general job execution command may be divided (i.e., converted) into a function virtualization command by the control unit 140 to be described below.

For example, as the virtualization group scheme is applied, the image forming apparatus 100-1 as performing the fax transmission is displayed on the mobile apparatus 200 side and thus the execution command of the fax transmission job may be input as the general job execution command. However, when the image forming apparatus 100-1 may not perform the fax transmission, the image forming apparatus 100-1 may process the general job execution command into the function virtualization command.

Further, the communication interface unit 110 receives printing data. Here, the printing data may be data of a printer language such as a postscript (PS) and a printer control language (PCL) and when the image forming apparatus 100 supports direct printing, the printing data may be files such as PDF, XPS, BMP, and JPG. The printing data may be received from the mobile apparatus 200 and may also be received from other separate terminal apparatuses.

Further, the communication interface unit 110 may request the allocation of the memory resources to the other image forming apparatuses 100-2 and 100-3 or the mobile apparatus 200. In this case, the request may include the information on the memory resource capacity of data required for the job execution. Further, the communication interface unit 110 may receive allocation acknowledgement corresponding to the request from the other image forming apparatuses 100-2 and 100-3 or the mobile apparatus 200.

When the memory resources of the other apparatuses 100-2, 100-3, and 200 are allocated to the image forming apparatus 100-1, the communication interface unit 110 transmits data required for jobs to other apparatuses which are connected to the image forming apparatus 100-1 and thus may temporarily store the data in the repositories of other apparatuses.

For example, the communication interface unit 110 may transmit the scanning images generated from the scanning unit 120 to the other apparatuses 100-2, 100-3, and 200 so as to be temporarily stored in the repositories of the other apparatuses 100-2, 100-3, and 200. Further, the communication interface unit 110 may request the data transmission to the other apparatuses 100-2, 100-3, and 200 at any timing to receive the scanning images transmitted to the repositories of the other apparatuses 100-2, 100-3, and 200.

Further, the communication interface unit 110 may receive a request of the allocation of the memory resources depending on the memory virtualization operation from the other image forming apparatuses 100-2 and 100-3. In response thereto, the communication interface unit 110 may transmit the allocation acknowledgement.

When the allocation of the memory resource of the image forming apparatus 100-1 to other apparatuses is performed, the communication interface unit 110 may receive data required for job execution of the other image forming apparatuses from other image forming apparatuses. In this case, the received data may be stored in the pre-allocated region of the storage unit 170 to be described below. Further, the communication interface unit 110 responds to the request of the other image forming apparatuses 100-2 and 100-3 to transmit the pre-stored data to the other image forming apparatuses 100-2 and 100-3.

Further, the communication interface unit 110 transmits the rest jobs which are not performed by the image forming apparatus 100-1 during the job to the other image forming apparatuses 100-2 and 100-3 within the job group. In detail, the communication interface unit 110 may transmit the jobs to be performed by the other image forming apparatuses 100-2 and 100-3 to the other image forming apparatuses 100-2 and 100-3 at the time of the function virtualization operation.

In this case, the communication interface unit 110 may transmit jobs, which are to be distributed, to the image forming apparatuses 100-2 and 100-3 determined by the control unit 140 to be described below, in which the distributed jobs may be transmitted to one of the other image forming apparatuses or the plurality of other image forming apparatuses.

Further, the communication interface unit 110 receives some jobs related to the job execution command input from other image forming apparatuses within a job group. The received job may be transferred to the scanning unit 120 or the printing unit 130 to be processed.

Further, the communication interface unit 110 may transmit its own state information or the progress state related to the received job to other image forming apparatuses which transmit jobs.

Further, the communication interface unit 110 may transmit the information on the job progress which is currently being performed to the mobile apparatus 200. Further, when the job requested by the mobile apparatus 200 is completed, the communication interface unit 110 may notify the corresponding mobile apparatus 200 of the job completion.

Further, the communication interface unit 110 transmits scanning data. In detail, in response to the scanning job command of the user, the scanning data generated from the scanning unit 120 to be described below may be transmitted to the storage apparatus corresponding to the corresponding command. Here, the storage apparatus may be the mobile apparatus which inputs a scanning command, a file storage server, and the like.

Meanwhile, the communication interface unit 110 may be connected to the mobile apparatus 200 through NFC, WiFi Direct, Bluetooth, and the like. In this case, the communication interface unit 110 may be connected to the mobile apparatus 200 by compositely using the above-mentioned communication scheme. For example, the communication interface unit receives the job execution command, and the like from the mobile apparatus 200 by the NFC connection scheme. In this case, the communication interface unit receives the IP address, and the like of the mobile apparatus 200 and then may perform the notification of the scan completion or data transmission and reception for the memory virtualization operation by the WiFi Direct scheme or the network scheme.

The scanning unit 120 scans manuscripts to generate scanning images. In detail, the scanning unit 120 may be implemented in a flatbed form or an automatic document feeder (ADF) form. Further, the scanning unit 120 may generate the scanning image depending on the set scanning option.

Here, the scanning option may include a scanning function option (for example, scanning options such as scan area, scan resolution, whether to perform the color scanning, and whether to perform both sides scanning) associated with the scanning operations of the scanning unit 120 which are associated with the scanning region, the scanning resolution, and the like and an image processing option (for example, whether to perform the color correction for the scanning image, whether to perform the conversion into the mono scanning, a file attribute of the scanning image, and the like) which may be processed by an image processing scheme.

The printing unit 130 prints the printing data. In detail, the printing unit 130 may print the printing data received through the communication interface unit 110 or print the scanning images generated by the scanning unit 120. Further, when the image forming apparatus 100 may perform the fax job, the printing unit 130 may print fax data received through a fax line.

The control unit 140 controls each component of the image forming apparatus 100. In detail, the control unit 140 may generate the job group including the image forming apparatus 100-1 and the other image forming apparatuses 100-2 and 100-3. Meanwhile, the control unit 140 may group the other connectable image forming apparatuses into one job group, but may group only the apparatus satisfying the preset conditions into one job group. Here, the apparatus satisfying the preset conditions may be an apparatus within a preset distance, an apparatus within the same subnet, an apparatus having the same apparatus name, an apparatus selected by the user in the first image forming apparatus 100-1, an apparatus selected by the user in the mobile apparatus 200 or an apparatus selected by the user, an apparatus selected by a manager in the management server (not illustrated), a merged one of the forgoing conditions, and the like.

In the generation process of the job group, the control unit 140 may generate the job group in consideration of the functions supported by the image forming apparatuses 100-1, 100-2, and 100-3. For example, the image forming apparatus which may perform the general function like the printing task restrictively performs the grouping using the grouping scheme as described above and the image forming apparatus which may perform tasks with scarcity such as the color printing, the fax transmission, and the e-book generation function may be included in the job group without any restrictions.

That is, the apparatuses within the job group may generate the job group in a form which may perform various functions. For example, when among the plurality of retrieved image forming apparatuses, an apparatus which may perform the fax transmission is one, the control unit 140 may basically include the image forming apparatus, which may perform the corresponding fax transmission, in the job group.

Further, when the job execution command is input, the control unit 140 may determine whether the input job execution command uses the virtual grouping scheme. Further, if the control unit 140 uses the virtual grouping scheme, an apparatus for performing a job and a function and a work rate which are performed by the corresponding apparatus may be determined. Further, the control unit 140 may control the scanning unit 120, the printing unit 130, and the communication interface unit 110 to allow the determined apparatus for performing the each distributed function.

Further, when the job execution command is input, the control unit 140 may determine whether the input job execution command is a multi job command. In detail, when the execution command of the second job using one of the scanning unit and the printing unit is input while the first job using the other of the scanning unit and the printing unit is performed, the control unit 140 may determine that the input job execution command is the multi job. In this case, the first job may be the scanning job, the fax transmission job, or the e-book generating job which uses the scanning unit or the printing job or the fax receiving job which uses the printing unit. Further, when the first job is the job using the scanning unit, the second job may be the printing job or the fax receiving job and when the first job is the job using the printing unit, the second job may be the scanning job, the fax transmission job, or the e-book generating job.

Further, when the input job execution command is the multi job command, the control unit 140 uses the storage space within the image forming apparatus 100-1 to determine whether to simultaneously perform the plurality of jobs. As the determination result, when the job processing may be performed in the storage space, the storage unit 140 may control the scanning unit 120 and the printing unit 130 to simultaneously perform the first job and the second job. Meanwhile, the foregoing exemplary embodiment describes that it is determined whether to perform the job using the storage space within the image forming apparatus 100-1 only when the input job execution command is the multi job command, but actually, it may be determined whether the general job command needs the memory virtualization operation and the memory virtualization operation to be described below may be performed on the general single job command.

Further, when the plurality of jobs may not be simultaneously performed using the storage space within the image forming apparatus 100-1, the control unit 140 is determined that the memory virtualization operation is required and may determine the apparatus to which the memory resource is allocated. In detail, the control unit 140 may determine at least one of other image forming apparatuses within the preset job group in which the image forming apparatus is included as the repositories of other apparatuses in which the data required for the second job are stored. Meanwhile, when the job execution command of the user is received from the mobile apparatus 200, the control unit 140 may determine the mobile apparatus 200 as other apparatuses in which the data required for the second job are stored.

In this case, the control unit 140 may determine other apparatuses in which the data required for the second job are stored in consideration of the available capacity of the storage space of the other apparatuses. In detail, the control unit 140 may determine at least one of the other image forming apparatuses within the job group as the repositories of the other apparatuses in which the data required for the second job are stored in consideration of the available capacity of the storage space of each of the other image forming apparatuses within the job group. If the available capacity of each of the other image forming apparatuses within the job group is not enough to store the data required for the second job, the plurality of other image forming apparatuses within the job group are determined as the repository in which the data required for the second job are stored or at least one of the image forming apparatuses and the mobile apparatus may also be determined as the repository in which the data required for the second job are stored.

Further, the control unit 140 may control the communication interface unit 110 to transmit the data required for the second job to the determined other apparatus. Further, when the space to process the data required for the second job is secured in the internal storage space within the image forming apparatus 100-1 depending on the progress of the first job, the control unit 140 may control the communication interface unit 110 to receive the data stored in other apparatuses.

Further, when the requested job is completed, the control unit 140 may notify the mobile apparatus 200 requesting the job of the completion of the job. The notification may be implemented using various alarm schemes such as SMS, a messenger, application notification.

Meanwhile, when receiving the request of the allocation of the memory resources from the other image forming apparatuses 100-2 and 100-3, the control unit 140 may determine whether the memory resource may be allocated. Further, if it is determined that the memory resource may be allocated, the control unit 140 may control the communication interface unit 110 to notify the allocation acknowledgement of the memory resource. Further, when data are received from other image forming apparatuses within the job group depending on the allocation acknowledgement, the control unit 140 may store the received data in the pre-allocated region of the storage unit 170. Further, when receiving the request of the retransmission of the data stored in the pre-allocated region, the control unit 140 may control the communication interface unit 110 to transmit the data stored in the storage unit.

The image forming apparatus 100 according to the exemplary embodiment of the present invention may receive the execution commands of other jobs and simultaneously perform the plurality of jobs even when the current job is being performed. Therefore, the user need not wait for the completion of the corresponding job even when the image forming apparatus 100 is performing the job, and as a result, the user convenience may be improved.

Further, the image forming apparatus 100 according to the exemplary embodiment of the present invention may perform the job using the memory resources of other apparatuses and the functions of other apparatuses and therefore may perform the functions and the jobs which are not supported by the image forming apparatus 100.

Only the schematic configuration of the image forming apparatus 100 is illustrated and described above, but the image forming apparatus 100 may further include components other than the foregoing components. A more detailed configuration of the image forming apparatus 100 will be described in detail below with reference to FIG. 7.

Figure 7:
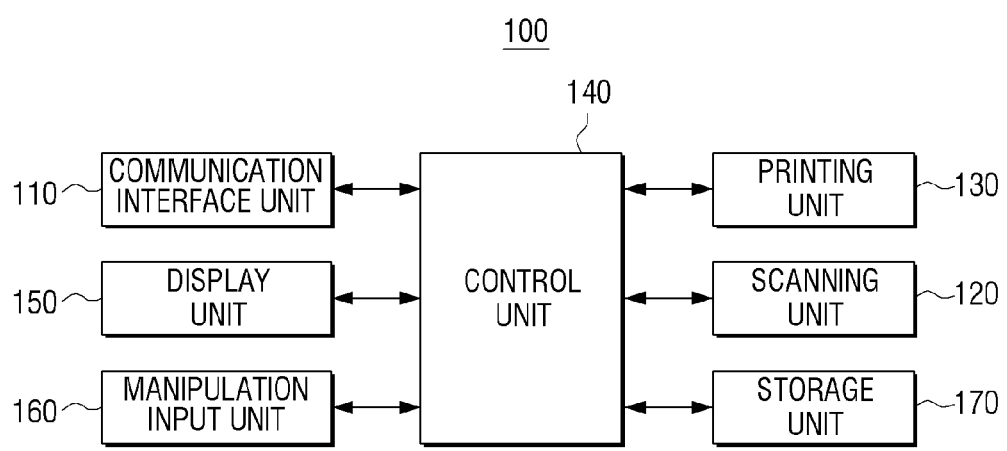
FIG. 7 is a detailed block diagram of the image forming apparatus according to an exemplary embodiment of the present invention.

FIG. 7 is a detailed block diagram of the image forming apparatus according to the exemplary embodiment of the present invention.

Referring to FIG. 7, the image forming apparatus 100 according to the exemplary embodiment of the present invention may be configured to include the communication interface unit 110, the scanning unit 120, the printing unit 130, the control unit 140, the display unit 150, a manipulation input unit 160, and the storage unit 170.

The communication interface unit 110, the scanning unit 120, the printing unit 130, and the control unit 140 are the same as the components described with reference to FIG. 6 and therefore the overlapping description thereof will be omitted.

The display unit 150 displays various kinds of information which are provided from the image forming apparatus 100. The display unit 150 may be a monitor such as an LCD and a CRT and may be implemented as a touch screen which may simultaneously perform a function of the manipulation input unit 160 to be described below.

The display unit 150 may display a list of the plurality of other connectable image forming apparatuses 100-2 and 100-3. In detail, the display unit 150 may display the list of the image forming apparatuses which are retrieved by the communication interface unit 110. In this case, the display unit 150 may display the information of each apparatus together. Here, the apparatus information which may be displayed may include the function, the position, the apparatus name, and the like which are supported by the corresponding apparatus. The user may select the plurality of image forming apparatuses through the displayed list to generate the job group.

Further, the display unit 150 may display whether the image forming apparatus 100 is performing the current job.

Further, the display unit 150 displays the UI for controlling the function of the image forming apparatus 100-1. The user may input a control command for controlling the function of the image forming apparatus 100-1 through the displayed UI. In this case, the user may input a selection of copying, fax, scan to e-mail, scan to server, or equipment setting change functions which may be performed by the image forming apparatus 100-1 and an option for the corresponding function through the displayed UI. Meanwhile, only the selection of copying, fax, scan to e-mail, scan to server, or equipment setting change functions is described above as the function which may be performed by the image forming apparatus 100-1, but actually, if other functions supported by the image forming apparatus in addition to the foregoing functions are present, it is apparent that the corresponding function may also be applied.

In this case, the user may input only one function and may also input the plurality of functions. That is, the manipulation input unit 160 may receive the execution command for the job using the plurality of functions. Here, the jobs using the plurality of functions may include the function which is not supported by the current image forming apparatus 100-1.

In detail, the user may receive the function which may be performed by a combination with the other image forming apparatuses 100-2 and 100-3 and the option thereof through the displayed UI. In detail, when the image forming apparatus 100-1 belongs to the job group and thus may perform the virtual grouping operation, the display unit 150 may display the UI for receiving the job which may be performed using the function of other image forming apparatuses within the virtual group. In this case, the user may select the other image forming apparatuses 100-2 and 100-3 which perform the input job.

Meanwhile, when the current image forming apparatus 100 is performing the first job, the display unit 150 may display that if the job execution command additionally input by the user may be processed by the multi job scheme, the job execution command additionally input by the user is processed by the multi job scheme.

Meanwhile, the display unit 150 displays the execution result for the received job. In detail, when the job input from the user is the multi job, the display unit 150 may display the progress state of each of the plurality of jobs. Further, when the job input from the user is the virtual grouping operation, the display unit 150 may display the job result in the current image forming apparatus 100-1 and the job results in the other image forming apparatuses 100-2 and 100-3 together.

Further, the display unit 150 may display the information of the other image forming apparatuses 100-2 and 100-3 which are performing the virtual grouping operation. In detail, the display unit 150 may notify the user of the apparatus names, the positions, and the like of the other image forming apparatuses 100-2 and 100-3 which are performing the virtual grouping operation. Meanwhile, actually, the forgoing information is provided as a printed matter or may be displayed on the mobile apparatus which transmits the job command.

Meanwhile, when an error occurs in another image forming apparatus 100-2 which is performing the virtual grouping operation, the display unit 150 may display that an error occurs and may display the list of another image forming apparatus 100-3 which may replace the job executed by the image forming apparatus 100-2 in which the error occurs.

Therefore, the user may select another image forming apparatus on the list to resume the job.

The manipulation input unit 160 includes a plurality of function keys by which the user may set or select various kinds of functions supported by the image forming apparatus 100. The manipulation input unit 160 may be implemented as a plurality of buttons, a keyboard, a mouse, and the like and may also be implemented as a touch screen which may simultaneously perform the function of the display unit 150 described above.

Further, the manipulation input unit 160 may receive other image forming apparatuses within the job group to which the image forming apparatus 100-1 belongs. Further, the manipulation input unit 160 may receive the job execution command from the user. In this case, the manipulation input unit 160 may receive the function options depending on the received job execution command together.

Further, when the job execution command requiring the function virtualization operation is received from the user, the manipulation input unit 160 may select other image forming apparatuses in which the function virtualization operation is performed.

Further, the manipulation input unit 160 may receive the information (for example, authentication information (ID, password), employee ID, telephone number, host apparatus address, etc.) of the user. When the corresponding job is completed later, the received information of the user may be used to notify the completion of the job.

The storage unit 170 stores job data. In detail, the storage unit 170 may store the data required for the job execution of the scanning unit 120 and/or the printing unit 130 which are described above. Further, the storage unit 170 may receive and store the printing data and the job data which are transferred from other apparatuses. The storage unit 170 may be implemented as a storage medium in the image forming apparatus 100 and an external storage medium, for example, a removable disk including a USB memory, a storage medium connected to a host, a web server though a network, and the like.

The image forming apparatus 100 according to the exemplary embodiment of the present invention may receive the execution commands of other jobs and simultaneously perform the plurality of jobs even when the current job is being performed. Therefore, the user need not wait for the completion of the corresponding job even when the image forming apparatus 100 is performing the job, and as a result, the user convenience may be improved.

Further, the image forming apparatus 100 according to the exemplary embodiment of the present invention may perform the job using the memory resources of other apparatuses and the functions of other apparatuses and therefore may perform the functions and the jobs which are not supported by the image forming apparatus 100.

Figure 8:
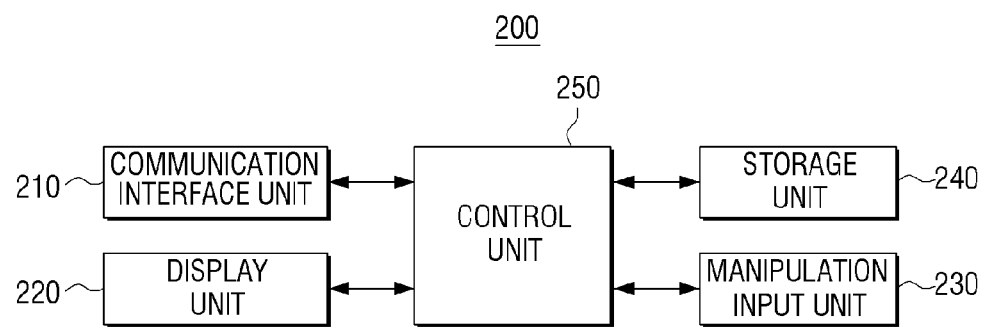
FIG. 8 is a detailed block diagram of a mobile apparatus according to an exemplary embodiment of the present invention.

FIG. 8 is a detailed block diagram of the mobile apparatus according to the exemplary embodiment of the present invention.

Referring to FIG. 8, the mobile apparatus 200 may be configured to include a communication interface unit 210, a display unit 220, a manipulation input unit 230, a storage unit 240, and a control unit 250. Here, the mobile apparatus 200 may communicate with the image forming apparatus 100 and may be a mobile notebook, a mobile phone, a smart phone, a PMP, an MP3 player, etc.

The communication interface unit 210 is formed to connect the mobile apparatus 200 to external devices and may be implemented to be connected through a local area network (LAN) and the Internet network and to be connected through a universal serial bus (USB) port and a wireless module. Here, the wireless module may be WiFi, WiFi Direct, near field Communication (NFC), Bluetooth, IR, etc.

The communication interface unit 210 may retrieve the connectable image forming apparatus 100. Further, the communication interface unit 210 may receive the information on the function which may be performed by the connectable image forming apparatus 100 and an operation state thereof.

Further, the communication interface unit 210 may receive the information on the function options which are supported the selected image forming apparatus 100. In detail, the communication interface unit 210 may receive the information for displaying the UI related to the function option setting of the user and the communication interface unit 210 may also directly receive the UI related to the function option setting.

Further, the communication interface unit 210 may transmit the job executions which are performed by the selected image forming apparatus 100. In this case, the communication interface unit 210 may also transmit the information on the function option for the corresponding job together. Meanwhile, the job command may be a general job command or may be a multi job command by which the image forming apparatus which is performing the job simultaneously performs other jobs.

Further, the communication interface unit 210 may receive the information on the job progress situation in the image forming apparatus 100 and when the job performed by the image forming apparatus 100 is the scanning job, the communication interface unit 210 may receive the scanning data which are the scanning results.

Further, the communication interface unit 210 may receive the request of the allocation of the memory resources depending on the memory virtualization operation from the image forming apparatus 100. In this case, the request may include the capacity information of the memory resource of data required for the second job execution.

Further, the communication interface unit 210 may transmit the information on permission corresponding to the allocation request of the resource and the allocation capacity to the corresponding image forming apparatus. Further, depending on the allocation, the communication interface unit 210 may receive the data transmitted from the image forming apparatus 100 and may transmit the previously received and stored data to the image forming apparatus 100.

The display unit 220 may display various kinds of information which are supported by the mobile apparatus 200. The display unit 220 may be a monitor such as an LCD and a CRT and may be implemented as a touch screen which may simultaneously perform a function of the manipulation input unit 230 to be described below.

Further, the display unit 220 may display a list of applications which are installed in the mobile apparatus 200. Further, the display unit 220 may display an execution screen depending on the driving of the applications.

Further, the display unit 220 may display the screen for selecting the image forming apparatuses which perform jobs. In this case, the display unit 220 may display the positions of the adjacent image forming apparatuses in a map form. Further, the display unit 220 may display the position and the job progress situation of the corresponding image forming apparatus.

Further, the display unit 220 may display the screen for selecting the job which is performed by the image forming apparatuses which are previously selected. In detail, the display unit 220 may display the screen for receiving the functions which are performed by the selected image forming apparatus and the options (for example, scanning option, etc.)

of the functions. Meanwhile, the exemplary embodiment of the present invention describes that the image forming apparatus is selected and then the jobs and the scanning options are selected but actually, the jobs may be first selected and then the image forming apparatuses may be selected.

Further, the display unit 220 may display the UI for selecting the option for whether to permit the request of the memory virtualization operation by the image forming apparatus 100.

Further, the display unit 220 may display the progress state of the requested job.

The manipulation input unit 230 includes a plurality of function keys by which the user may set or select various kinds of functions supported by the mobile apparatus 200. The manipulation input unit 230 may be implemented as apparatuses such as a mouse, a keyboard, and the like and may also be implemented as a touch screen which may simultaneously perform the function of the display unit 220 described above.

Further, the manipulation input unit 230 may receive the driving command of the applications. In detail, when the user wants to perform the job using the image forming apparatus, he/she may drive the applications which are installed in the mobile apparatus 200 or input a driving command for a web browser application accessing a specific web page.

Further, the manipulation input unit 230 may select a specific application from the list of the applications which are installed in the mobile apparatus 200 displayed on the display unit 220.

Further, the manipulation input unit 230 may receive the selection of the image forming apparatus which performs the job. In detail, the manipulation input unit 230 may select the image forming apparatus which performs the job from the list of the plurality of image forming apparatuses displayed on the display unit 220.

Further, the manipulation input unit 230 may receive the job which is performed by the image forming apparatus previously selected. In detail, the manipulation input unit 230 may receive the functions which are performed by the selected image forming apparatus and the options (for example, scanning option, etc.) of the functions.

Further, the manipulation input unit 230 may select the option for whether to permit the memory virtualization operation requested by the image forming apparatus 100. The option may be preset or may be set when the job command selected by the user is the multi-job command. When the user selects an option that the corresponding mobile apparatus 200 does not participate in the memory virtualization operation, the operation of allocating the memory resource to the image forming apparatus 100 to be described below may not be performed.

The storage unit 240 may store various kinds of information and the scanning data which are received through the communication interface unit 210. Further, the storage unit 240 may store the data transferred from the image forming apparatus 100 in the storage space allocated by the allocation of the memory resource. The storage unit 240 may be implemented as a storage medium in the mobile apparatus 200 and an external storage medium, for example, a removable disk including a USB memory, a web server though a network, and the like.

The control unit 250 controls each component of the mobile apparatus 200. In detail, when receiving the driving command of the applications for using the image forming apparatus from the user, the control unit 250 may control the communication interface unit 210 to retrieve the connectable image forming apparatus.

Further, the control unit 250 may control the display unit 220 and the manipulation input unit 230 to display and select the retrieved image forming apparatus. Further, the control unit 250 may control the display unit 220 and the manipulation input unit 230 to select the functions which are performed by the image forming apparatus selected by the user and the function options.

Further, the control unit 250 may determine whether the mobile apparatus 200 participates in the memory virtualization operation of the image forming apparatus. The determination may be made by the selection of the user and may be automatically made depending on the available capacity of the memory space of the mobile apparatus 200. When the user sets the case in which the mobile apparatus does not participate in the memory virtualization operation as an option, the control unit 250 may not accept even the request of the allocation of the memory resource by the image forming apparatus 100.

Meanwhile, when the user sets the case in which the mobile apparatus participates in the memory virtualization operation as an option, the control unit 250 may determine whether the mobile apparatus participates in the memory virtualization operation in consideration of the allocation capacity required by the image forming apparatus 100. In detail, when the allocation capacity required by the image forming apparatus 100 deviates from capacity which may be provided from the mobile apparatus 200, the control unit 250 may control the communication interface unit 210 to determine that the mobile apparatus does not participate in the memory virtualization operation or notify that only the range of the available capacity is allocated. Meanwhile, the case in which the mobile apparatus 200 side determines whether the mobile apparatus may participate in the memory virtualization operation is described above, but actually, the mobile apparatus 200 provides available capacity to the image forming apparatus 100 and the image forming apparatus 100 determines whether the mobile apparatus 200 may participate in the memory virtualization operation.

The control unit 250 may allocate the preset region of the storage unit 240 to the image forming apparatus 100. Therefore, when data are received from the image forming apparatus, the control unit 250 may store the received data to the allocated region of the storage unit 240. Further, in response to the request of the data transmission of the image forming apparatus, the control unit 250 may control the communication interface unit 210 so as to transmit the data stored in the storage unit 240 to the image forming apparatus 100.

Further, when the execution of the job requested by the image forming apparatus 100 is completed, the control unit 250 may control the display unit 220 so as to display the completion of the job and re-allocate the memory resource allocated to the image forming apparatus 100 as its own resource.

As described above, the mobile apparatus 200 according to the exemplary embodiment of the present invention may control the image forming apparatus 100-1 to simultaneously perform other jobs while performing one job, thereby performing the job at an even higher speed. Further, when the storage space is insufficient while the image forming apparatus 100-1 performs a job, the memory resource may be provided to the corresponding image forming apparatus and therefore a plurality of jobs may be stably performed.

Figure 9:
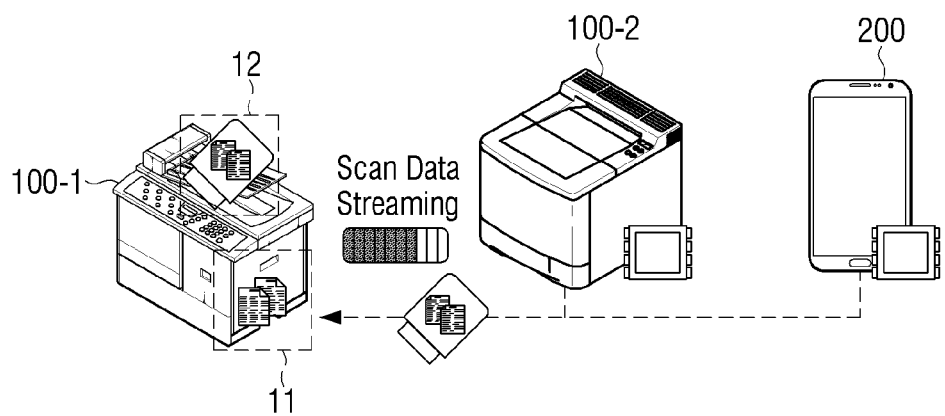
FIG. 9 is a diagram for describing a memory virtualization operation according to another exemplary embodiment of the present invention.

FIG. 9 is a diagram for describing a memory virtualization operation according to another exemplary embodiment of the present invention.

Referring to FIG. 9, the image forming system 1000 includes two image forming apparatuses 100-1 and 100-2 and the mobile apparatus 200.

The memory virtualization operation according to another exemplary embodiment of the present invention performs the memory virtualization operation using a plurality of other apparatuses. Hereinafter, for ease of description, it is assumed that the first image forming apparatus 100-1 is performing the printing job requested by a host apparatus (not illustrated) and the second image forming apparatus 100-2 is another image forming apparatus which does not perform a job.

The user uses the mobile apparatus 200 to request the scanning job to the first image forming apparatus 100-2. The first image forming apparatus 100-2 receiving the job request determines that the scanning job command of the user may be performed simultaneously with the printing job which is currently being performed and performs the scanning job while the printing job is performed.

Meanwhile, as the scanning job is performed, when the memory resource in the first image forming apparatus 100-1 is insufficient, the first image forming apparatus 100-1 may request the allocation of the memory resource to the second image forming apparatus 100-2 and the mobile apparatus 200. Both of the two apparatuses do not have the storage capacity enough to store data required to process the second scanning job, but if the sum of the storage capacity of the two apparatuses may appropriate for the memory resources required to process the second scanning job, the first image forming apparatus 100-1 may share and use the memory resources of both of the apparatuses.

In detail, the first image forming apparatus 100-1 may sequentially transmit (for example, stream) the scanning image generated by the scanning job to the second image forming apparatus 100-2 and the mobile apparatus 200 or alternately transmit the generated scanning image to the second image forming apparatus 100-2 and the mobile apparatus 200.

Further, when there is an extra storage space within the first image forming apparatus 100-1 as the first job is progressed, the first image forming apparatus 100-1 receives a portion or all of the scanning images transmitted to the second image forming apparatus 100-2 and the mobile apparatus 200 to complete the second scanning job. Meanwhile, even when the scanning operation of the scanning unit 120 is completed, the printing job which is the first job is not completed and therefore the extra storage space within the first image forming apparatus 100-1 is not generated, the first image forming apparatus 100-1 transmits the data required for the first job to the second image forming apparatus 100-2 and/or the mobile apparatus 200 to prepare the storage space, thereby preferentially completing the second job.

Figure 10:
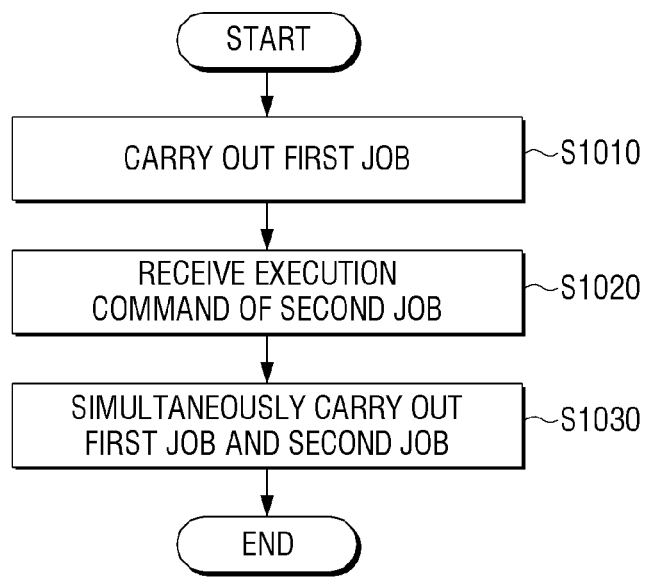
FIG. 10 is a flow chart for describing a printing control method in the image forming apparatus according to the exemplary embodiment of the present invention.

FIG. 10 is a flow chart for describing a printing control method in the image forming apparatus according to the exemplary embodiment of the present invention.

The first job using one of the scanning unit and the printing unit is performed (S1010). In this case, the first job may be the scanning job, the fax transmission job, or the e-book generating job which uses the scanning unit or the printing job or the fax receiving job which uses the printing unit.

Further, the printing control method receives the execution command of the second job using the other of the scanning unit and the printing unit while the first job is performed (S1020). In detail, the execution command of the second job using the scanning unit or the printing unit which is not used in the first job may be input through the mobile apparatus connected to the image forming apparatus or the manipulation input unit of the image forming apparatus. Here, when the first job is the job using the scanning unit, the second job may be the printing job or the fax receiving job and when the first job is the job using the printing unit, the second job may be the scanning job, the fax transmission job, or the e-book generating job.

Further, in response to the execution command of the second job, the second job is performed simultaneously with the performing the first job (S1030). In detail, in consideration of the available capacity of the internal storage space within the image forming apparatus, it is determined whether to simultaneously perform the first job and the second job using only the storage space within the image forming apparatus.

As the determination result, when the two jobs may be simultaneously performed only in the storage space within the image forming apparatus, the two jobs may be simultaneously performed without using the memory virtualization operation. On the other hand, when the two jobs may not be simultaneously performed only in the storage space within the image forming apparatus, the data required for the second job are transmitted to other apparatuses which are connected to the image forming apparatus to be temporarily stored in the repositories of the other apparatuses. For example, when the second job is the scanning job, the generated scanning images may be transmitted to the repositories of the other apparatuses so that the scanning images generated by the scanning unit are temporarily stored in the repositories of the other apparatuses and the scanning images transmitted to the repositories of the other apparatuses may be received at any timing.

Here, as described above, the other apparatuses may be other image forming apparatuses within the virtualization job group as described above or may be the mobile apparatus which transmits the job execution command. Further, the foregoing any timing may be timing (for example, the completion timing of the first job, the timing when the data used for the first job are transmitted to other apparatuses, and the like) when the space to process the data required for the second job is secured within the internal storage space of the image forming apparatus as the first job is progressed.

Meanwhile, the case in which the image forming apparatus uses the memory resources of other image forming apparatuses is described above, but the image forming apparatus may be operated in the opposite situation. That is, the operation corresponding to the request of the memory resources of other image forming apparatuses may be performed. In detail, when the data are received from other image forming apparatuses within the job group, the received data are stored in the storage unit within the image forming apparatus and the operation of transmitting the data stored in the storage unit to other image forming apparatuses in response to the request of other image forming apparatuses may be performed.

As described above, the printing control method according to the exemplary embodiment of the present invention may be configured to allow the image forming apparatus 100-1 to perform other jobs while performing one job, thereby performing the job at an even higher speed. Further, when the storage space is insufficient while the image forming apparatus 100-1 performs the job, the image forming apparatus 100-1 may perform the job using the memory resources of other image forming apparatuses 100-2 and 100-3 or the mobile apparatus 200, thereby stably performing the plurality of jobs. The printing control method as illustrated in FIG. 10 may be performed in the image forming apparatus having the configuration of FIG. 6 or 7 and may also be performed on the image forming apparatus having other configurations.

Further, the printing control method as described above may be implemented as programs including algorithm which may be executed in a computer and the programs may be provided while being stored in a non-transitory computer readable medium.

The non-transitory computer readable medium is not a medium that stores data therein for a while, such as a register, a cache, a memory, or the like, but means a medium that semi-permanently stores data therein and is readable by a device. In detail, various applications or programs described above may be stored and provided in the non-transitory computer readable medium such as a compact disk (CD), a digital versatile disk (DVD), a hard disk, a Blu-ray disk, a universal serial bus (USB), a memory card, and a read only memory (ROM).

Figure 11:
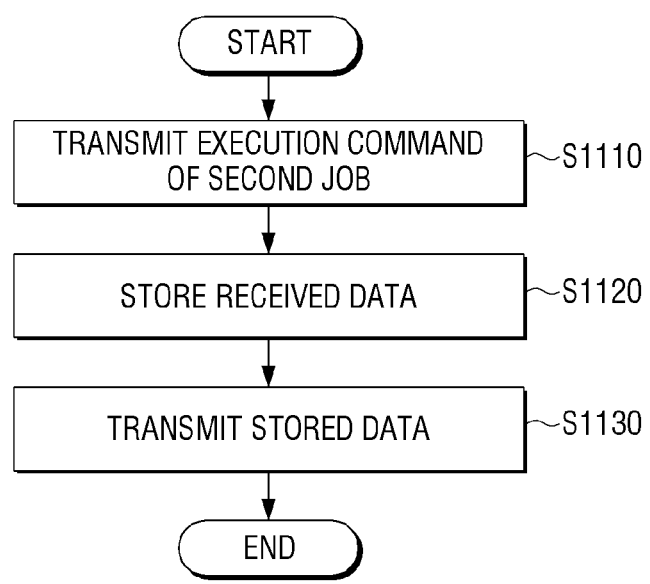
FIG. 11 is a flow chart for describing a printing control method in the mobile apparatus according to the exemplary embodiment of the present invention.

FIG. 11 is a flow chart for describing the printing control method in the mobile apparatus according to the exemplary embodiment of the present invention.

Referring to FIG. 11, the execution command of the second job using one of the scanning unit and the printing unit is transmitted to the image forming apparatus which performs the first job using the other of the scanning unit and the printing unit (S1110). In detail, the UI screen for the function control of the image forming apparatus may be displayed and the job command for the image forming apparatus may be input to the displayed UI screen. In this case, the job command may be a general job command and the multi job command to simultaneously perform the second job while the first job is performed. In this case, the first job may be the scanning job, the fax transmission job, or the e-book generating job which uses the scanning unit or the printing job or the fax receiving job which uses the printing unit. Further, when the first job is the job using the scanning unit, the second job may be the printing job or the fax receiving job and when the first job is the job using the printing unit, the second job may be the scanning job, the fax transmission job, or the e-book generating job.

Further, when the data required for the second job are received, the received data are stored (S1120). In detail, when the extension of the memory resource of the image forming apparatus is requested while the image forming apparatus simultaneously performs the plurality of jobs in response to the job execution command, the image forming apparatus may notify the mobile apparatus 200 that the memory virtualization operation is required. In this case, the data capacity required to perform the requested second job may be transmitted together. In this case, if the mobile apparatus 200 has the memory capacity enough to store the data required for the second job, the memory resource of capacity requested by the image forming apparatus may be allocated to the image forming apparatus. When the image forming apparatus transmits the data required for the job depending on the allocation, the transmitted data may be stored.

Further, when the transmission for the stored data is requested from the image forming apparatus, the stored data are transmitted to the image forming apparatus (S1130). Meanwhile, when the execution of the second job is completed, the memory resource allocated to the image forming apparatus may be re-allocated to its own memory resource.

As described above, the printing control method of the mobile apparatus according to the exemplary embodiment of the present invention may control the image forming apparatus 100-1 to simultaneously perform other jobs while performing one job, thereby performing the job at an even higher speed. Further, when the storage space is insufficient while the image forming apparatus 100-1 performs a job, the memory resource may be provided to the corresponding image forming apparatus and therefore a plurality of jobs may be stably performed. The printing control method of the mobile apparatus as illustrated in FIG. 10 may be performed by the mobile apparatus having the configuration of FIG. 8 and may also be performed by the mobile apparatus having other configurations.

Further, the printing control method of the mobile apparatus as described above may be implemented as programs or applications including algorithm which may be executed in a computer and the programs may be provided while being stored in a non-transitory computer readable medium.

Although the preferred embodiments of the present invention have been disclosed for illustrative purposes, those skilled in the art will appreciate that various modifications, additions and substitutions are possible, without departing from the gist of the invention as disclosed in the accompanying claims. Accordingly, such modifications, additions and substitutions should also be understood to fall within the technical idea of the present invention.

What is claimed is:

1. An image forming apparatus, comprising:
 a plurality of function units with regard to image forming including at least scanning, printing, configured to execute a plurality of jobs;
 a control unit configured to control the plurality of function units to simultaneously execute a first job and a second job when an execution command of the second job using one of a first function unit and a second function unit is detected while the first job using one of the first function unit and the second function unit is executed; and
 a communication interface unit configured to transmit data required to execute the second job to other apparatuses communicationally connected to the image forming apparatus to temporarily store the data in a repository of the other apparatuses.

2. The image forming apparatus as claimed in claim 1, wherein the plurality of function units comprise one or any combination of a scanning unit configured to scan information to generate a scanning job, a printing unit configured to print printing data, or a facsimile unit, and
 the first job is a printing job using the printing unit, and
 the second job is one of a scanning job using the scanning unit and a fax job using the fax unit.

3. The image forming apparatus as claimed in claim 2, wherein the communication interface unit transmits the scanning image generated from the scanning unit to the repository of the other apparatuses so as to temporarily store the generated scanning image in the repository of the other apparatuses for receiving the scanning image transmitted to the repository at any timing.

4. The image forming apparatus as claimed in claim 1, wherein the control unit determines whether to execute the second job in consideration of available capacity of an internal data storage space within the image forming apparatus and if determined that an execution of the second job is not made using the internal storage space, transmits the data required to execute the second job to the repository of the other apparatuses through the communication interface unit.

5. The image forming apparatus as claimed in claim 4, wherein the control unit receives job data stored in the repository of the other apparatuses through the communication interface unit when a space to process the data required to execute the second job is allocated within the internal storage space, depending on a progress of the first job.

6. The image forming apparatus as claimed in claim 1, wherein the control unit generates a job group of one or more of the other apparatuses and the image forming apparatus, and determines at least one of the other apparatuses within the job group as the repository of the other apparatuses in which the data required to execute the second job are stored.

7. The image forming apparatus as claimed in claim 6, wherein the control unit determines the at least one of the other apparatuses within the job group as the repository of the other apparatuses in which the data required to execute the second job are stored, in consideration of available capacity of storage spaces of the other apparatuses and the image forming apparatus within the job group.

8. The image forming apparatus as claimed in claim 7, wherein the control unit determines the at least one of the other apparatuses within the job group as the repository of the other apparatuses in which the data required to execute the second job are stored when the available capacity of the other apparatuses and the image forming apparatus within the job group is not sufficient to store the data required to execute the second job.

9. The image forming apparatus as claimed in claim 1, wherein the communication interface unit detects the execution command of the second job of a mobile apparatus as one of the other apparatuses communicationally wirelessly connected to the image forming apparatus.

10. The image forming apparatus as claimed in claim 1, further comprising:
    a storage unit configured to store job data,
    wherein the control unit stores the job data in the storage unit when the job data of other image forming apparatuses within a job group including the other image forming apparatuses and the image forming apparatus are received and transmits the job data stored in the storage unit to the other apparatuses through the communication interface unit, in response to a request of the other image forming apparatuses.

11. A mobile apparatus communicationally connectable to an image forming apparatus, comprising:
    a communication interface unit configured to transmit an execution command of a second job using one of first and second function units with regard to image forming to the image forming apparatus;
    a storage unit configured to store data required to execute the second job when the data is transmitted from the image forming apparatus while the image forming apparatus executed a first job using the one of the first and second function unit; and
    a control unit configured to retransmit the stored data required to execute the second job to the image forming apparatus through the communication interface unit in response to a request from the image forming apparatus for retransmission of the stored data required to execute the second job.

12. A control method of an image forming apparatus including a plurality of function units with regard to image forming including at least scanning, printing, the method comprising:
    executing, by the plurality of function units, a plurality of jobs;
    receiving an execution command of a second job using one of first and second function units; and
    controlling execution of the second job simultaneously while executing the first job, in response to the execution command of the second job,
    wherein in the executing of the second job, data required to execute the second job are transmitted to other apparatuses communicationally connected to the image forming apparatus to be temporarily stored in a repository of the other apparatuses.

13. The control method as claimed in claim 12, wherein the plurality of function units comprise one or any combination of a scanning unit configured to scan information, a printing unit configured to print printing data, or a facsimile unit, and
    the first job is a printing job using the printing unit, and
    the second job is one of a scanning job using the scanning unit and a fax job using the fax unit.

14. The control method as claimed in claim 13, wherein in the performing of the second job, a scanning image generated from the scanning unit is transmitted to the repository of the other apparatuses so as to temporarily store the generated scanning image in the repository of the other apparatuses for receiving the scanning image transmitted to the repository at any timing.

15. The control method as claimed in claim 12, further comprising:
    determining whether to execute the second job in consideration of available capacity of an internal data storage space within the image forming apparatus,
    wherein in the performing of the second job, when an execution of the second job is not made using the internal storage space, the data required to execute the second job are transmitted to the repository of the other apparatuses.

16. The control method as claimed in claim 15, wherein in the performing of the second job, job data stored in the repository of the other apparatuses are received when a space to process the data required to execute the second job is allocated within the internal storage space, depending on a progress of the first job.

17. The control method as claimed in claim 12, further comprising:
    generates a job group of one or more of the other apparatuses and the image forming apparatus, and determining at least one of the other apparatuses within job group as the repository of the other apparatuses in which the data required to execute the second job are stored.

18. The control method as claimed in claim 17, wherein in the determining, the at least one of the other apparatuses within the job group is determined as the repository of the other apparatuses in which the data required to execute the second job are stored, in consideration of available capacity of storage spaces of the other apparatuses and the image forming apparatus within the job group.

19. The control method as claimed in claim 18, wherein in the determining, the at least one of the other apparatuses within the job group are determined as the repository of the other apparatuses in which the data required to execute the second job are stored when the available capacity of the other apparatuses and the image forming apparatus within the job group is not sufficient to store the data required to execute the second job.

20. The control method as claimed in claim 12, wherein in the receiving, the execution command of the second job is detected from a mobile apparatus as one of the other apparatuses communicationally wirelessly connected to the image forming apparatus.

21. The control method as claimed in claim 12, further comprising:
    storing data in a storage unit within the image forming apparatus when data are received from other image forming apparatuses as the other apparatuses within a job group including the other image forming apparatuses and the image forming apparatus, and
    transmitting the data stored in the storage unit to the other image forming apparatuses, in response to a request of the other image forming apparatus.

22. A non-transitory computer readable recording medium including a program for executing a control method of a mobile apparatus communicationally connectable to an image forming apparatus including a plurality of function units with regard to image forming, wherein the control method of the mobile apparatus includes:

transmitting an execution command of a second job using one of first and second function units from among the function units of the image forming apparatus to the image forming apparatus;

storing data required to execute the second job when the data is transmitted from the image forming apparatus while the image forming apparatus executes a first job using the one of the first and second function units; and retransmitting the stored data required to execute the second job to the image forming apparatus in response to a request from the image forming apparatus for retransmission of the stored data required to execute the second job.

* * * * *